April 3, 1951           H. C. RICH           2,547,490
PROVISION FOR TURNING DOUGHNUTS IN DOUGHNUT COOKERS
Filed Dec. 11, 1947                               3 Sheets-Sheet 1
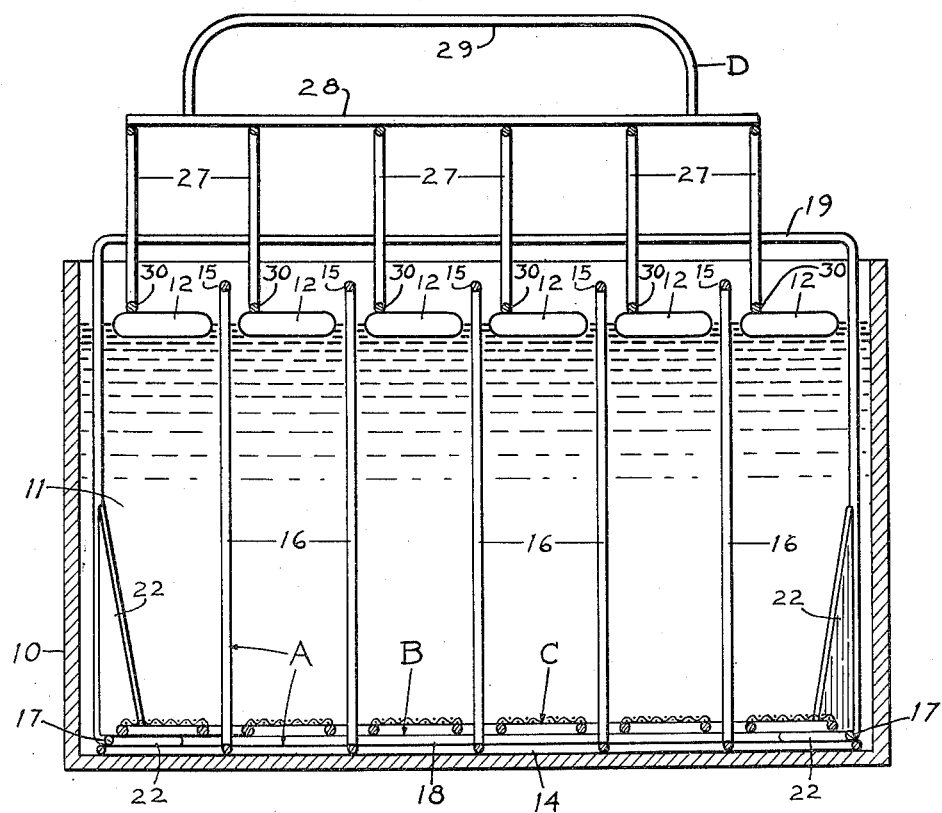
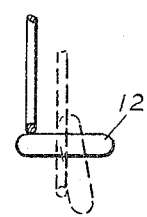
HOMER C. RICH
INVENTOR.

April 3, 1951  H. C. RICH  2,547,490
PROVISION FOR TURNING DOUGHNUTS IN DOUGHNUT COOKERS
Filed Dec. 11, 1947  3 Sheets-Sheet 2

HOMER C. RICH
INVENTOR.

BY
G. Lorenze Miller

April 3, 1951            H. C. RICH            2,547,490
PROVISION FOR TURNING DOUGHNUTS IN DOUGHNUT COOKERS
Filed Dec. 11, 1947            3 Sheets-Sheet 3
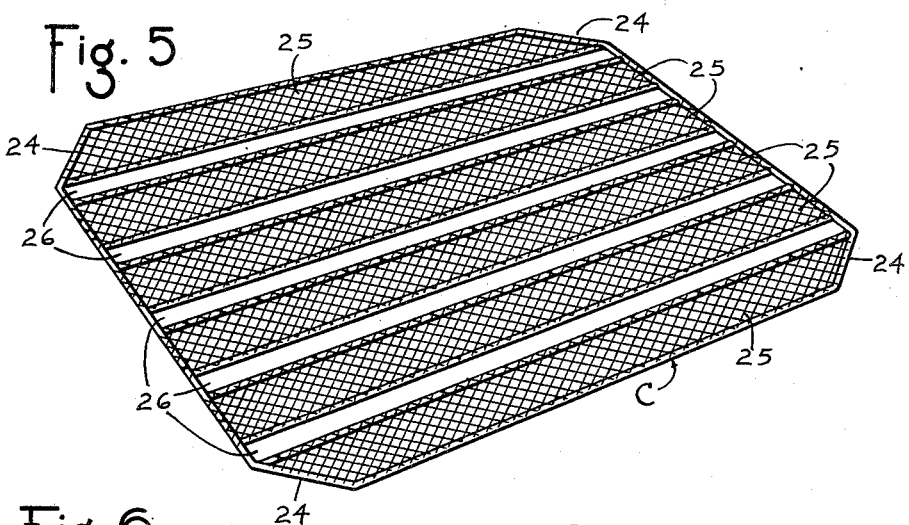
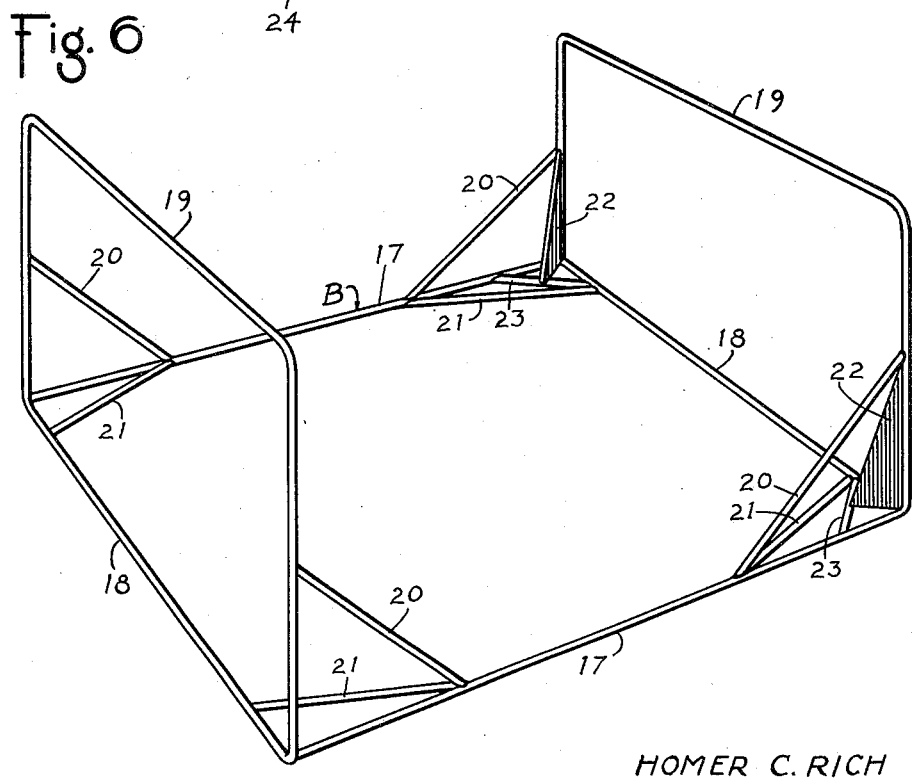
HOMER C. RICH
*INVENTOR.*

Patented Apr. 3, 1951

2,547,490

UNITED STATES PATENT OFFICE 2,547,490

PROVISION FOR TURNING DOUGHNUTS IN DOUGHNUT COOKERS

Homer C. Rich, Lake City, Ill.

Application December 11, 1947, Serial No. 791,115

2 Claims. (Cl. 99—409)

This invention relates to the cooking of doughnuts and has more particularly to do with the turning of the doughnuts during the cooking operation. It consists in the provision of simplified and inexpensive yet practical and highly efficient, correlated and cooperatively associated, open-work elements or fittings to be used in connection with an ordinary or conventional rectangular deep hot grease container or doughnut cooking vat for cooking at one time a large quantity of doughnuts and turning simultaneously each and all of the doughnuts during the cooking thereof.

Generally stated, the fittings of the invention include an open separator or partition frame first placed in the cooking vat to divide the same into a multiplicity of separate, parallel, restricted spaces each of a width only slightly greater than the diameter of each doughnut, the respective spaces to accommodate separate rows of doughnuts floating freely on the body of deep hot fat contained in the vat and circulatable throughout the extent thereof through open-work division and body walls of the partition frame.

The fittings further include another open frame and a companion plate-like tray to be placed on and carried thereby. These assembled elements including the tray, carrying thereon separate rows of uncooked doughnuts, are lowered into the vat and thus place said rows of uncooked doughnuts in the respective partitioned spaces as provided in the vat by the applied first mentioned frame, the several doughnuts remaining afloat on the body of deep hot fat while the second mentioned frame and its carried tray continue to move downward until coming to rest on the bottom of the frame first inserted in the vat. This second frame with its carried tray is lifted to remove the cooked doughnuts from the vat.

Still another frame is included in the fittings of the present invention. This particular frame is termed the turner frame. It is to be lowered into the vat, after the doughnuts are cooked to a predetermined degree on one side, whereby to turn simultaneously all of the doughnuts.

In the adaptation of the invention illustrated in the accompanying drawings—

Figure 1 is a cross-sectional view of a cooking vat with the partition frame and the doughnut placer and remover frame in place therein, and the turner frame about to be lowered into the vat for the turning of the doughnuts;

Figure 2 is a fragmentary view illustrating the action of the turner frame in turning a doughnut;

Figure 5 is a perspective view of the tray element; and

Figure 6 is a perspective view of the placer and remover frame.

Figure 3:
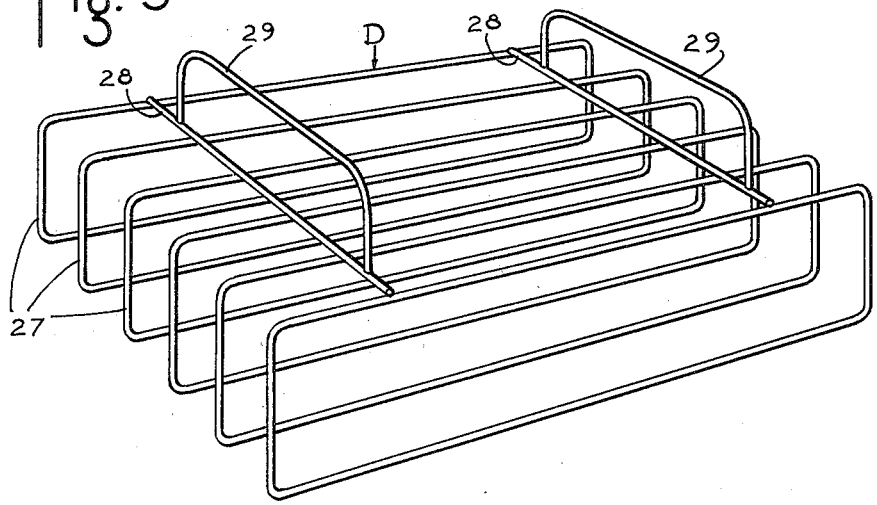
Figure 3 is a perspective view of the turner frame.

Referring now to the drawings in detail, the numeral 10 designates an ordinary or conventional cooking vat of an open-top and generally plain rectangular form, containing a body 11 of deep hot grease which is heated in any obvious manner by means not shown, as the same, of itself, is not a part of the present invention. In accordance with this invention, however, there is provided a special separator or partition frame A, which may be in the form shown in Figure 4, for placement in the vat 10 as indicated in Figure 1 and providing partitioned, transversely restricted, parallel, longitudinal spaces for the accommodation of separate rows of doughnuts 12 floating freely on the body of hot grease 11 between the partitions of the frame. This frame is open throughout the entire extent thereof so as not to interfere with the proper circulation of the heated grease in the vat and the maintenance of proper temperature of the grease.

Figure 4:
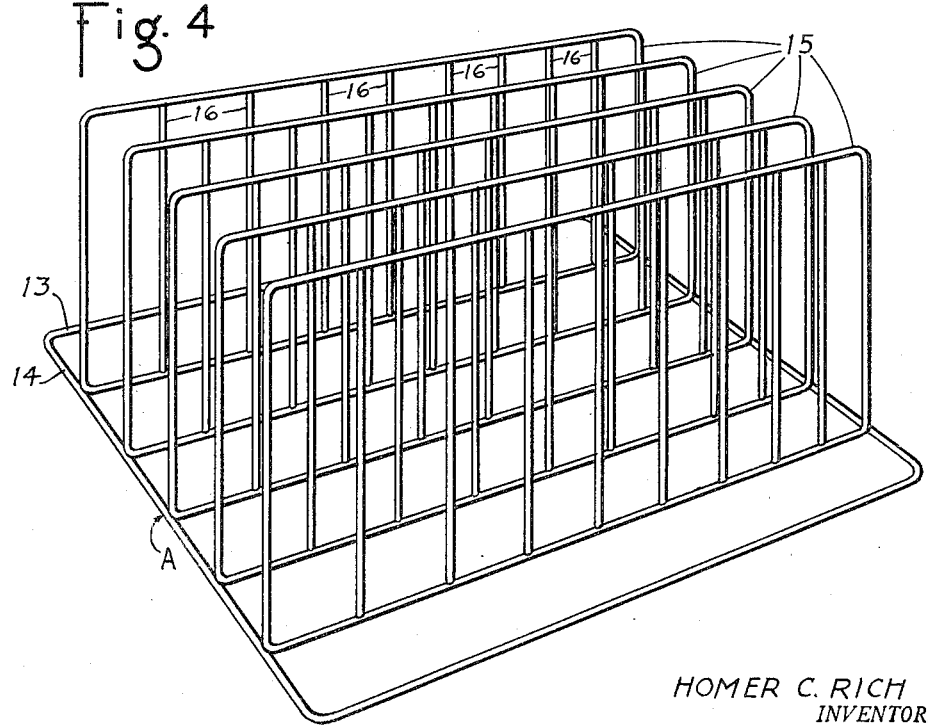
Figure 4 is a perspective view of the partition frame.

As shown more clearly in Figure 4, the frame A comprises a rectangular base portion including the longitudinal side members 13 and transverse end members 14. Extending between the end members 14 and welded or otherwise secured rigidly thereto are a plurality of transversely spaced apart upright open-frame partition members 15, the intermediate vertical bars 16 between the end bars of said partition members 15 being obviously spaced close enough together to prevent a doughnut passing therebetween, but the respective longitudinal spaces between the several partition members 15 are, of course, slightly wider than the diameter of a doughnut so that rows of doughnuts can float freely between the partitions.

In use, the separator or partition frame A rests directly on the bottom of the vat 10 and remains in place throughout the entire time of cooking the doughnuts.

A placer and remover frame B and a cooperative doughnut carrier and lifter tray C (see Figures 5 and 6 for details) are provided for insertion in the vat 10 after the frame A is in place. This frame B, as shown, is slightly longer than the frame A, but the two frames are of substantially the same overall width. As shown (see Figure 6) the frame B has an open rectangular bottom portion comprising the longitudinal side rails 17 and transverse end rails 18. Bail-like end members 19 are provided and these end members are braced to the longitudinal base rails 17 by diagonal stays 20.

Further rigidity is given the frame B by diagonal bottom corner braces 21 which afford supports for the opposite end portions of the tray C when applied to the frame B. So, too, as shown, diagonal gusset plates or stays 22 may be provided at least at one end of the frame B (see Figure 6). These plates or stays 22, as shown, are welded or otherwise attached at their vertical edges to the adjacent corner uprights of the end members 19 of the frame and the bottom edges of said plates or stays 22 are secured to shorter diagonal braces 23 just inside of the adjacent bottom brace 21. These plates or stays 22, in addition to further stiffening the frame structure B, provide stops engaged by the end of the applied tray C so as to assure accurate positioning of the tray on the frame. For example, the tray C may be pushed endwise at the open and unobstructed end of the frame B until the forward end of the tray comes against the plates or stays 22 at the opposite end of said frame B. So, too, the tray may be lowered from above onto the frame B and then brought with one of its ends into contact with said plates or stays 22.

The tray C (see Figure 5) is generally rectangular except that its end corners are beveled or cut-off diagonally, as at 24. This is to make it easier to apply the tray to the frame B without its corners catching against any part of the frame or its corners otherwise interfering with the handling of the tray. The body of this tray C is generally of open-work throughout, that is to say, it is perforated or made foraminous to permit passage of the hot grease therethrough and the ready draining of the same therefrom yet the openings must be small enough for the retention of doughnuts on the tray. As indicated (see Figure 5) the major portion of the tray is covered by open mesh wire fabric 25, in elongated parallel strips between which are longitudinal slots 26. On the mesh fabric portions 25 are placed rows of the uncooked doughnuts 12 to be thereby carried and placed in the vat 10, and by the same means removed from the vat after cooking, the slotted portion 26 of the tray passing over the partitions 15 of the frame A in the vat.

When the tray C is loaded with the uncooked doughnuts and lowered on the frame B into the vat 10, the frame A, of course, having been previously placed in the vat, the several rows of doughnuts on the tray are thereby placed in the respective longitudinal spaces between partition members 15 of said frame A and left floating on the hot grease 11 as the frame B continues its downward movement and comes to rest on the bottom portion of said frame A.

A turner frame D (see Figure 3 for details) is provided for use in turning the doughnuts during the cooking thereof. As shown, this frame comprises a plurality of laterally spaced, rectangular, upright, parallel frame members 27, in number equalling the number of spaces afforded by the separator or partition frame A. These frame members 27 are cross-connected at their tops and near their ends, by welding or other rigid securing means, to transverse supporting bars 28 from which they depend in fixed relation to each other.

As shown, a bail-like handle 29 is provided on each cross-bar 28 of the turner frame D (see Figure 3) for convenience in handling and manipulating the frame. That is, in operating said frame D, with an operator holding it by the handle 29, the same is lowered and manipulated in the vat 10 by first placing it in the relation above the vat as shown in Figure 1. In other words, first holding the frame above the floating doughnuts 12 with the lower horizontal bars 30 of the longitudinal frame members 27 near the respective partition members 15 of the frame A at one side of the several cooking spaces and some distance off center of the respective rows of doughnuts in the spaces. The thus positioned frame D is lowered with a gentle first downward movement until the frame bars 30 come in contact with the doughnuts 12 and then with a continued downward and slight lateral bodily movement of the frame A towards the opposite partitions all the doughnuts are caused to turn over simultaneously for cooking on the opposite side thereof. This turning action is illustrated in the fragmentary view in Figure 2 of the drawings, wherein the position of the doughnut 12 about to be turned and the actuating members 27 and 30 of the frame A is indicated in full lines, while dotted lines show the turning action.

After the doughnuts are turned as above indicated, the frame D is allowed to continue movement downward until its cross-bars 28 come to rest on the top horizontal bars of the longitudinal members 15 of the first placed frame A and the lower bars 30 are then located some distance below the floating doughnuts. The thus lowered and supported frame D is allowed to so remain until the cooking is done.

After the cooking of the doughnuts is completed the turner frame D is first removed, and thereafter the placer and remover frame B, with the tray C thereon, is lifted and removed from the vat, taking with them the cooked doughnuts 12.

Obviously, after removal of the loaded frame B and carrier tray C, the cooked doughnuts 12 are readily removable from the tray. This may be accomplished while the tray is still on the removed frame B, or the tray may be first either lifted or else moved endwise from the frame before the cooked doughnuts are removed.

While the illustrated structural provisions form a practical adaptation of the invention, modification and change is contemplated within the spirit and scope of the appended claims. The invention, therefore, is not limited to the construction and arrangement shown.

What is claimed is:

1. An assembly to be used in connection with a rectangular vat for cooking in deep hot fat contained in the vat a number of doughnuts floating in the fat, the assembly consisting of a generally rectangular open separator frame having a horizontal bottom portion to rest on the bottom of the vat and provided with transversely spaced apart, upright, partition members dividing the vat into separate parallel cooking spaces each of a width slightly greater than the diameter of a doughnut, and the partition members including vertical bars spaced at a distance apart less than the diameter of a doughnut, an open placer frame and a separate independent doughnut carrier tray to be carried by said placer frame and thereby lowered into and lifted from the vat, said placer frame resting on the bottom of said separator frame and the carrier tray having parallel open-work doughnut carrier strips with intervening parallel slots to pass freely over the upright partition members of said separator frame, and an open turner frame having a plurality of transversely spaced apart, depending, vertical members corresponding in number to the number of cooking spaces provided with the applied separator frame in the vat, each vertical member having a horizontal lower doughnut turner bar engaging and turning simultaneously the doughnuts floating in each cooking space in the vat when the turner frame is lowered into the vat with the turner bars of the frame brought first in contact with the top side of each doughnut off center thereof and close to a common side of the respective cooking spaces of the separator frame, and a continued combined downward and transverse movement of the turner frame inverting the doughnuts with their previously under sides uppermost.

2. An assembly as set forth in claim 1, wherein the depending doughnut turning members of the turner frame are cross-connected at their upper portions by transverse supporting bars to rest on the top portions of the upright partition members of the separator frame after the lower bars of the doughnut turning members of the turner frame have turned the doughnuts and moved to a position below the same and said cross-connecting supporting bars have upstanding bail-like handles thereon for handling and manipulation of the turner frame.

HOMER C. RICH.

REFERENCES CITED

The following references are of record in the file of this patent:

UNITED STATES PATENTS

| Number | Name | Date |
|--------|------|------|
| 859,717 | Zinn | July 9, 1907 |
| 1,918,287 | Pieri | July 18, 1933 |
| 2,202,602 | Ruch | May 28, 1940 |
| 2,450,962 | Hornkohl et al. | Oct. 12, 1948 |